(12) United States Patent
Dai et al.

(10) Patent No.: US 9,083,453 B2
(45) Date of Patent: Jul. 14, 2015

(54) POWER SUPPLY GENERATOR WITH NOISE CANCELLATION

(75) Inventors: Liang Dai, San Diego, CA (US);
Lennart Karl-Axel Mathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 13/361,785

(22) Filed: Jan. 30, 2012

(65) Prior Publication Data

US 2012/0326686 A1    Dec. 27, 2012

Related U.S. Application Data

(60) Provisional application No. 61/500,583, filed on Jun. 23, 2011.

(51) Int. Cl.
*H02M 3/156* (2006.01)
*H04B 15/00* (2006.01)
*H04B 1/04* (2006.01)

(52) U.S. Cl.
CPC ............ *H04B 15/005* (2013.01); *H04B 1/0475* (2013.01); *H04B 1/0483* (2013.01)

(58) Field of Classification Search
CPC .. H04B 1/0475; H04B 1/0483; H04B 15/005; H02M 2001/0032; H02M 2001/0045; H02M 3/1584
USPC .......... 323/268, 270, 271, 282, 283; 341/143, 341/144
See application file for complete search history.

(56) References Cited

U.S. PATENT DOCUMENTS

| 6,300,826 | B1 | 10/2001 | Mathe et al. |
| 6,744,392 | B2 | 6/2004 | Melanson |
| 7,653,366 | B2 | 1/2010 | Grigore |
| 7,825,844 | B2 * | 11/2010 | Ballantyne .................... 341/144 |
| 8,504,217 | B2 * | 8/2013 | Nilsen et al. ................... 700/295 |
| 2005/0064830 | A1 * | 3/2005 | Grigore ....................... 455/127.4 |
| 2008/0003950 | A1 | 1/2008 | Haapoja et al. |

(Continued)

FOREIGN PATENT DOCUMENTS

| CN | 1750388 A | 3/2006 |
| CN | 1826726 A | 8/2006 |
| JP | 2008288977 A | 11/2008 |

OTHER PUBLICATIONS

International Search Report and Written Opinion—PCT/US2012/043917—ISA/EPO—Sep. 19, 2012.

*Primary Examiner* — Adolf Berhane
*Assistant Examiner* — Yemane Mehari

(57) ABSTRACT

Techniques for performing noise cancellation/attenuation are disclosed. In one design, an apparatus includes a power supply generator having a switcher, a coupling circuit, an envelope amplifier, and a feedback circuit. The switcher generates DC and low frequency components and the envelope amplifier generates high frequency components of a supply voltage for a load, e.g., a power amplifier. The switcher receives a first supply voltage and provides a switcher output signal having switcher noise. The coupling circuit receives the switcher output signal and provides a first output signal having a first version of the switcher noise. The feedback circuit receives the switcher output signal and provides a feedback signal. The envelope amplifier receives an envelope signal and the feedback signal and provides a second output signal having a second version of the switcher noise, which is used to attenuate the first version of the switcher noise at the load.

26 Claims, 10 Drawing Sheets

(56) References Cited

U.S. PATENT DOCUMENTS

| | | |
|---|---|---|
| 2009/0117865 A1 | 5/2009 | Vinayak et al. |
| 2010/0124265 A1 | 5/2010 | Shakiba et al. |
| 2011/0025422 A1 | 2/2011 | Marra et al. |
| 2011/0175678 A1 | 7/2011 | Velazquez |

* cited by examiner

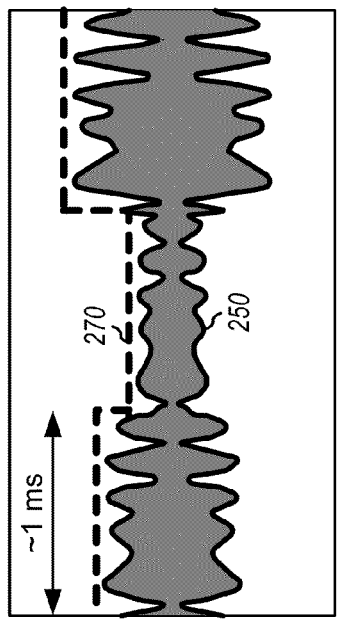
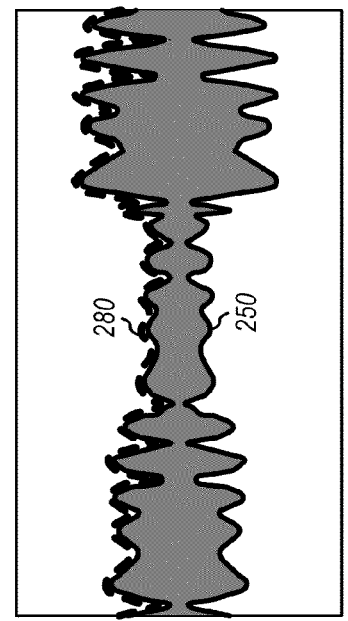
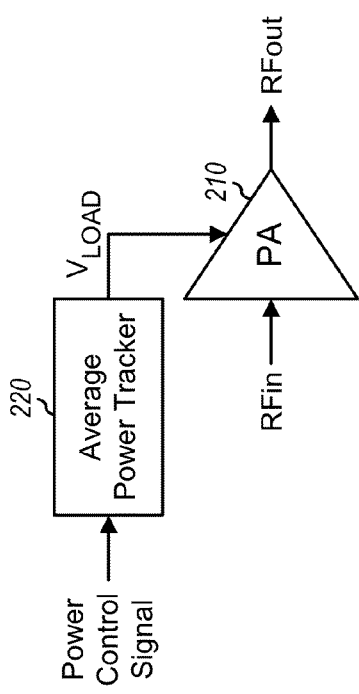
FIG. 2A
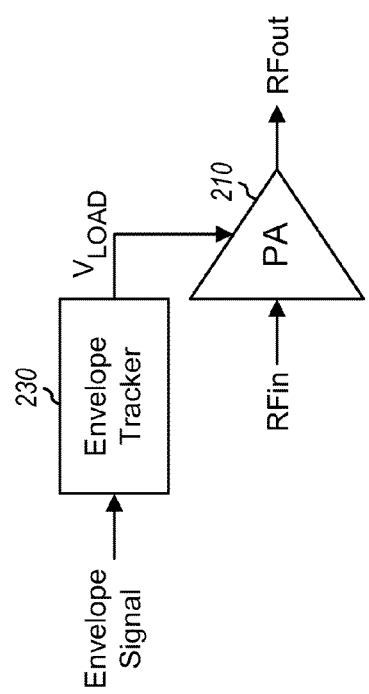
FIG. 2B

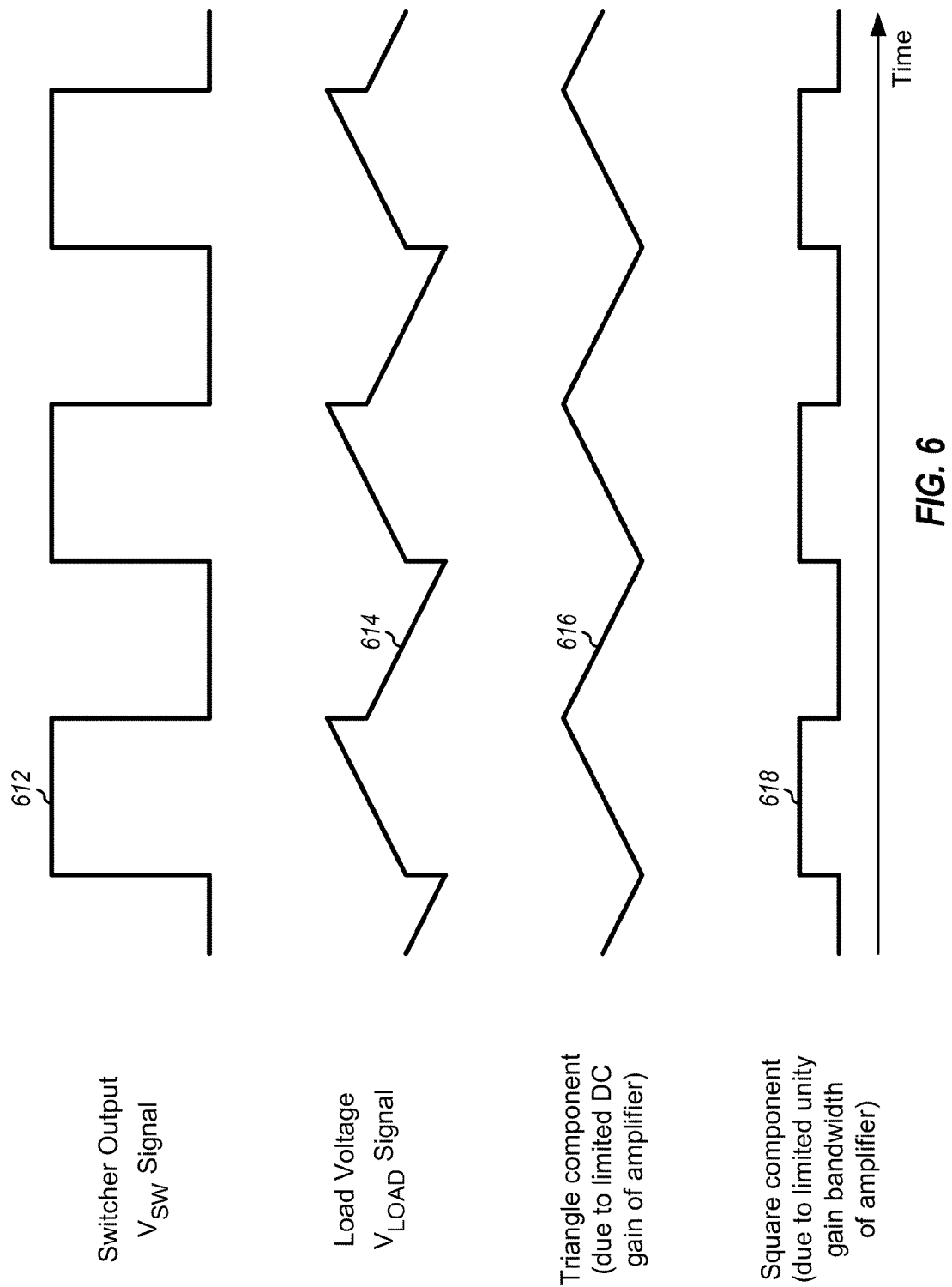

us 9,083,453 B2

POWER SUPPLY GENERATOR WITH NOISE CANCELLATION

CLAIM OF PRIORITY UNDER 35 U.S.C. §119

The present application for patent claims priority to Provisional Application No. 61/500,583, entitled "NOISE CANCELLATION CIRCUIT FOR A COMBINED LINEAR AND SWITCHED POWER SUPPLY" filed Jun. 23, 2011, and assigned to the assignee hereof and hereby expressly incorporated by reference herein.

BACKGROUND

I. Field

The present disclosure relates generally to electronics, and more specifically to techniques for reducing noise in a power supply generator and other circuits.

II. Background

In a communication system, a transmitter may process (e.g., encode and modulate) data to generate output samples. The transmitter may further condition (e.g., convert to analog, filter, frequency upconvert, and amplify) the output samples to generate an output radio frequency (RF) signal. The transmitter may then transmit the output RF signal via a communication channel to a receiver. The receiver may receive the transmitted RF signal and perform the complementary processing on the received RF signal to recover the transmitted data.

The transmitter typically includes a power amplifier (PA) to provide the required transmit power for the output RF signal. The power amplifier should be able to provide high transmit power whenever needed and should have high power-added efficiency (PAE) in order to reduce power consumption. A power supply generator may generate a supply voltage for the power amplifier. The power supply generator should efficiently generate the supply voltage with as little noise as possible, even with a low battery voltage.

SUMMARY

Techniques for performing noise cancellation/attenuation are described herein. The techniques may be used for various applications, such as for efficiently generating a supply voltage having less noise.

In one design, an apparatus may include a power supply generator comprising a switcher, a coupling circuit, an envelope amplifier, and a feedback circuit. The switcher may efficiently generate direct current (DC) and low frequency components of a supply voltage for a load (e.g., a power amplifier). The envelope amplifier may generate high frequency components of the supply voltage for the load and may be enabled only when needed. The switcher may receive a first supply voltage (e.g., a battery voltage) and provide a switcher output signal comprising switcher noise. The coupling circuit (e.g., an inductor) may receive the switcher output signal and provide a first output signal to the load. The first output signal may comprise a first version of the switcher noise. The feedback circuit may receive the switcher output signal and provide a feedback signal. The envelope amplifier may receive an envelope signal and the feedback signal and may provide a second output signal to the load. The second output signal may comprise a second version of the switcher noise used to attenuate or cancel the first version of the switcher noise at the load.

In another design, an apparatus may include a first circuit, a second circuit, and a feedback circuit. The first circuit may receive a first input signal comprising noise and provide a first output signal comprising a first version of the noise. The feedback circuit may also receive the first input signal and provide a feedback signal. The second circuit may receive a second input signal and the feedback signal and provide a second output signal comprising a second version of the noise, which may be used to attenuate the first version of the noise.

Various aspects and features of the disclosure are described in further detail below.

BRIEF DESCRIPTION OF THE DRAWINGS

FIGS. 2A and 2B show different ways of powering a power amplifier.

FIG. 6 shows waveforms of various signals in the power supply generator in FIG. 3.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Techniques for canceling/attenuating noise are described herein. The techniques may be used for various types of circuit such as a power supply generator. The techniques may also be used for various electronic devices such as wireless devices (e.g., cellular phones, smart phones, wireless modems, etc.) tablets, personal digital assistants (PDAs), handheld devices, laptop computers, smartbooks, netbooks, cordless phones, wireless local loop (WLL) stations, Bluetooth devices, consumer electronic devices, etc. For clarity, the use of the techniques to generate a supply voltage for a power amplifier in a wireless device is described below.

Figure 1:
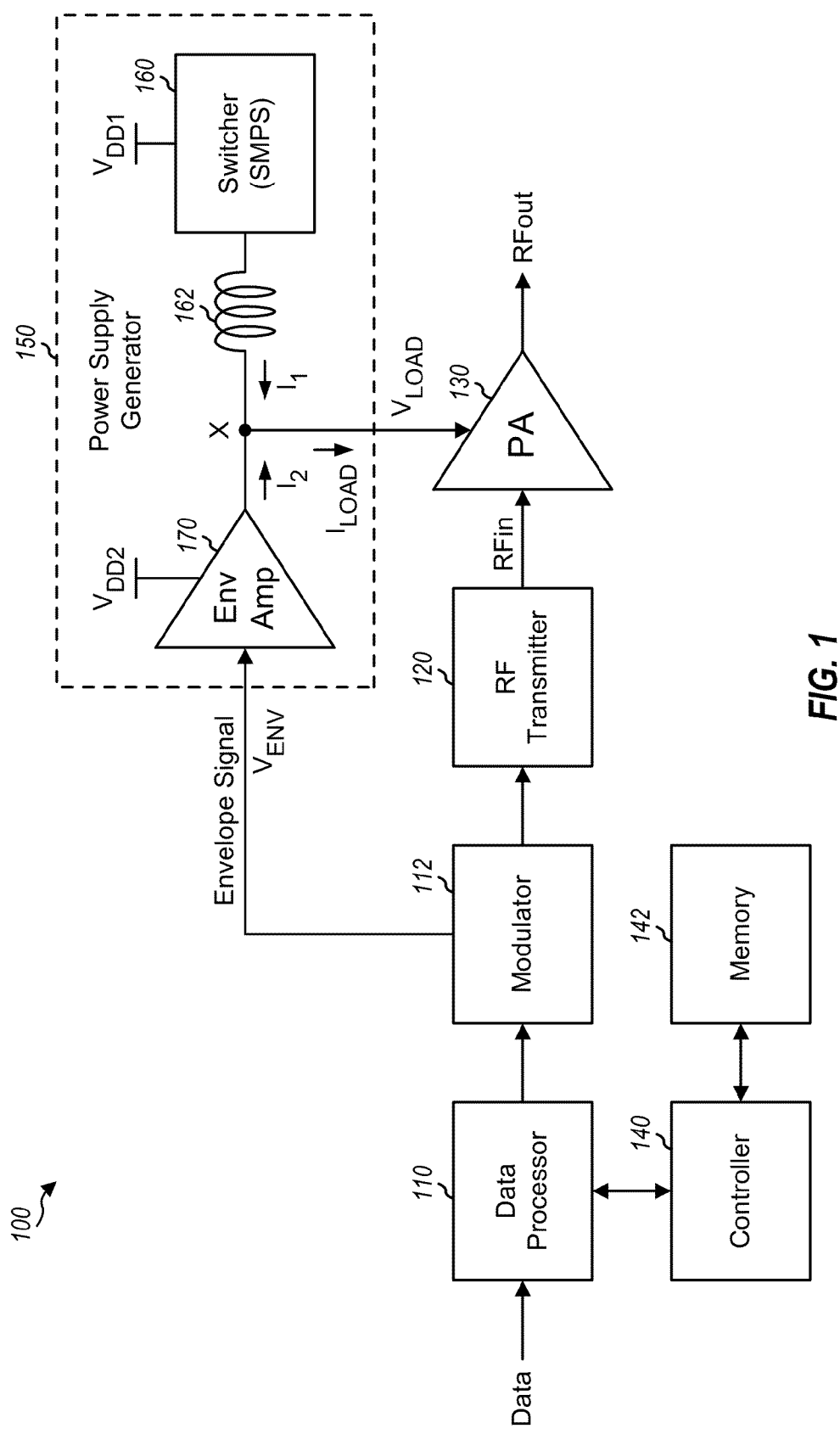
FIG. 1 shows a block diagram of a wireless device.

FIG. 1 shows a block diagram of a design of a wireless device 100, which may support communication with a Code Division Multiple Access (CDMA) 1X system, a Wideband CDMA (WCDMA) system, a Global System for Mobile Communications (GSM) system, a Long Term Evolution (LTE) system, a wireless local area network (WLAN) system, etc. For clarity, only a transmitter portion of wireless device 100 is shown in FIG. 1, and a receiver portion is not shown in FIG. 1.

Within wireless device 100, a data processor 110 may receive data to be transmitted, process (e.g., encode, interleave, and symbol map) the data, and provide data symbols. Data processor 110 may also process pilot and provide pilot symbols. A modulator 112 may receive the data and pilot symbols from data processor 110, perform quadrature modulation, polar modulation, or some other type of modulation, and provide output samples. Modulator 112 may also determine the envelope of the output samples, e.g., by computing the magnitude of each output sample and averaging the magnitude across output samples. Modulator 112 may provide an envelope signal indicative of the envelope of the output samples.

An RF transmitter 120 may process (e.g., convert to analog, amplify, filter, and frequency upconvert) the output samples from modulator 112 and provide an input RF signal (RFin). A power amplifier (PA) 130 may amplify the input RF signal to obtain the desired output power level and provide an output RF signal (RFout), which may be transmitted via an antenna (not shown in FIG. 1). RF transmitter 120 may also include circuits to generate the envelope signal, instead of using modulator 112 to generate the envelope signal.

A power supply generator 150 may receive the envelope signal from modulator 112 and may generate a power supply signal or supply voltage ($V_{LOAD}$) for power amplifier 130. Power supply generator 150 may also be referred to as an envelope tracker. In the design shown in FIG. 1, power supply generator 150 includes a switcher 160, an envelope amplifier (Env Amp) 170, and an inductor 162. Switcher 160 may also be referred to as a switching-mode power supply (SMPS), a switching power supply, etc. Switcher 160 receives a first supply voltage ($V_{DD1}$) and provides a first supply current ($I_1$) comprising DC and low frequency components to power amplifier 130. Inductor 162 stores current from switcher 160 and provides the stored current to node X on alternating cycles. Envelope amplifier 170 receives the envelope signal ($V_{ENV}$) at its signal input, receives a second supply voltage ($V_{DD2}$) at its power supply input, and provides a second supply current ($I_2$) comprising high frequency components to power amplifier 130. The supply current ($I_{LOAD}$) provided to power amplifier 130 includes the $I_1$ current from switcher 160 and the $I_2$ current from envelope amplifier 170. Envelope amplifier 170 also provides the $V_{LOAD}$ voltage at node X for power amplifier 130.

In one design, $V_{DD1}$ and $V_{DD2}$ may be the same voltage and may both be equal to a battery voltage, or an external power supply voltage, or some other voltage. In another design, $V_{DD1}$ may be different from $V_{DD2}$, for example, $V_{DD2}$ may be a higher voltage than $V_{DD1}$. $V_{DD1}$ and $V_{DD2}$ may each be a fixed voltage or a configurable/variable voltage.

A controller 140 may control the operation of various units within wireless device 100. A memory 142 may store program codes and data for controller 140 and/or other units within wireless device 100. Data processor 110, modulator 112, controller 140, and memory 142 may be implemented on one or more application specific integrated circuits (ASICs) and/or other ICs.

FIG. 1 shows an exemplary design of wireless device 100. Wireless device 100 may also be implemented in other manners and may include different circuits than those shown in FIG. 1. All or a portion of RF transmitter 120, power amplifier 130, and power supply generator 150 may be implemented on one or more analog integrated circuits (ICs), RF ICs (RFICs), mixed-signal ICs, etc.

It may be desirable to operate wireless device 100 with a low battery voltage in order to reduce power consumption, extend battery life, and/or obtain other advantages. New battery technology may be able to provide energy down to 2.5 volts (V) and below. However, a power amplifier may need to operate with a PA supply voltage (e.g., 3.2V) that is higher than the battery voltage. A boost converter may be used to boost the battery voltage to generate the higher PA supply voltage. However, the use of the boost converter to directly supply the PA supply voltage may increase cost and power consumption, both of which are undesirable.

FIG. 2A shows a diagram of generating a PA supply voltage ($V_{LOAD}$) for power amplifier 210 with an average power tracker (APT) 220. APT 220 receives a power control signal indicating the largest amplitude of the envelope of the RFout signal in each time interval. APT 220 generates the PA supply voltage (which is shown by a plot 270) for power amplifier 210 based on the power control signal. The difference between the PA supply voltage and the envelope of the RFout signal represents wasted power. APT 220 can reduce wasted power since it can generate the PA supply voltage to track the largest amplitude of the envelope in each time interval.

FIG. 2B shows a diagram of generating a PA supply voltage for power amplifier 210 with an envelope tracker 230. Envelope tracker 230 receives an envelope signal indicative of the envelope of the RFout signal and generates the PA supply voltage (which is shown by a plot 280) for power amplifier 210 based on the envelope signal. The PA supply voltage closely tracks the envelope of the RFout signal over time. Hence, the difference between the PA supply voltage and the envelope of the RFout signal is small, which results in less wasted power. The power amplifier may be operated in saturation for all envelope amplitudes in order to maximize PA efficiency.

Power supply generator 150 in FIG. 1 can implement envelope tracker 230 in FIG. 2B with high efficiency. This is achieved by a combination of (i) an efficient switcher 160 to generate a first supply current $I_1$ comprising DC and low frequency components and (ii) a linear envelope amplifier 170 to generate a second supply current $I_2$ comprising high frequency components.

Figure 3:
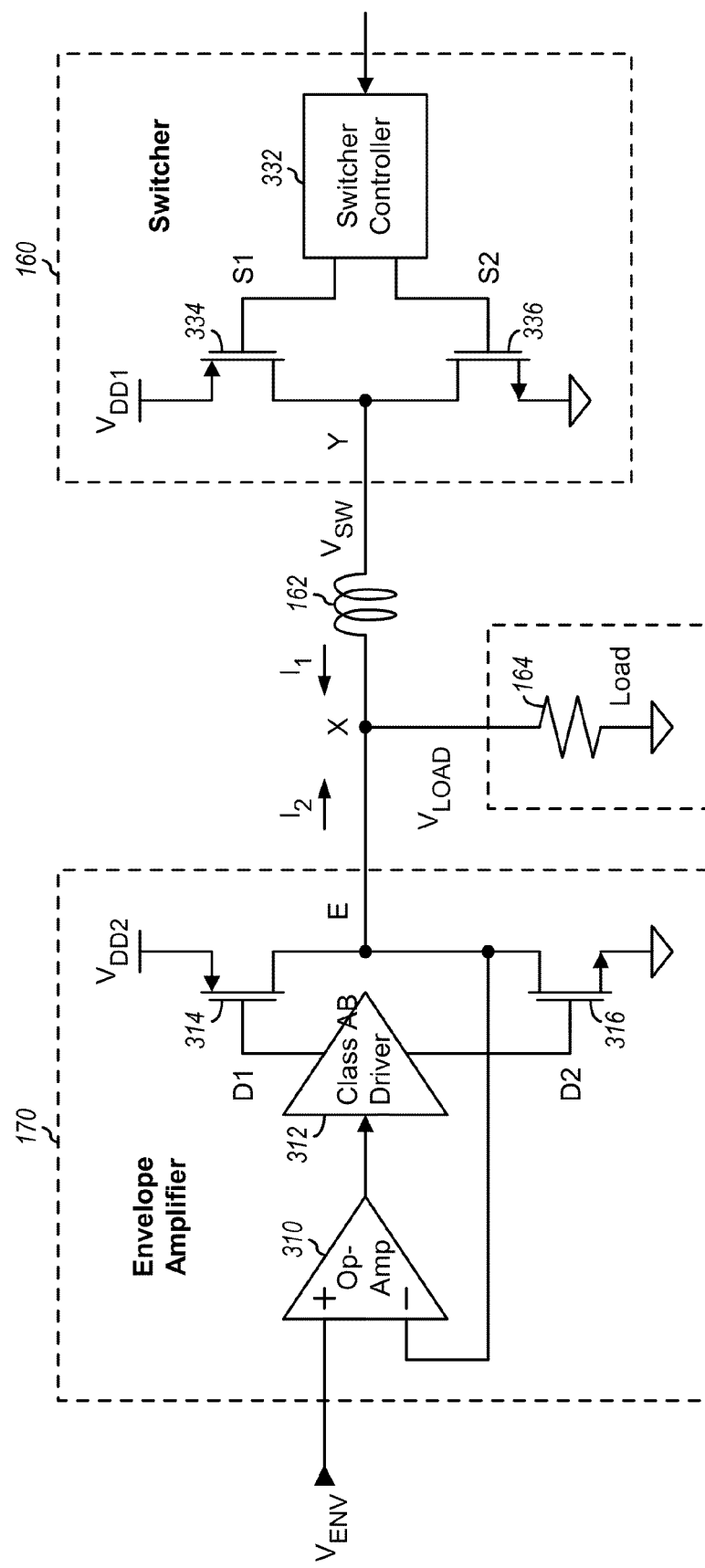
FIG. 3 shows a schematic diagram of a power supply generator.

FIG. 3 shows a schematic diagram of a design of switcher 160 and envelope amplifier 170 within power supply generator 150 in FIG. 1. Within envelope amplifier 170, an operational amplifier (op-amp) 310 has its non-inverting input receiving the envelope signal, its inverting input coupled to an output of envelope amplifier 170 (which is node E), and its output coupled to an input of a class AB driver 312. Driver 312 has its first output (D1) coupled to the gate of a P-channel metal oxide semiconductor (PMOS) transistor 314 and its second output (D2) coupled to the gate of an N-channel MOS (NMOS) transistor 316. NMOS transistor 316 has its drain coupled to node E and its source coupled to circuit ground. PMOS transistor 314 has its drain coupled to node E and its source receiving the $V_{DD2}$ voltage. Envelope amplifier 170 is connected as a unity-gain feedback amplifier, with the output being connected to the inverting input.

Within switcher 160, a switcher controller 332 receives an input indicative of the $I_2$ current from envelope amplifier 170 and generates S1 and S2 control signals. A PMOS transistor 334 has its source receiving the $V_{DD1}$ voltage, its drain coupled to node Y, and its gate receiving the S1 control. An NMOS transistor 336 has its drain coupled to node Y, its source coupled to circuit ground, and its gate receiving the S2 control. Inductor 162 is coupled between node X and node Y. A load 164 represents power amplifier 130 in FIG. 1 and is modeled with a resistor coupled to node X.

Switcher 160 operates as follows. Switcher 160 is in an On state when a high output current from envelope amplifier 170 is sensed. Controller 332 then provides a low voltage to the gate of PMOS transistor 334 and a low voltage to the gate of NMOS transistor 336. PMOS transistor 334 is turned on and couples the $V_{DD1}$ voltage to inductor 162, which stores energy from the $V_{DD1}$ voltage. The current through inductor 162 rises during the On state, with the rate of the rise being dependent on (i) the difference between the $V_{DD1}$ voltage and the $V_{LOAD}$ voltage at node X and (ii) the inductance of inductor 162. Conversely, switcher 160 is in an Off state when a low output current from envelope amplifier 170 is sensed. Controller 332 then provides a high voltage to the gate of PMOS transistor 334 and a high voltage to the gate of NMOS transistor 336. NMOS transistor 336 is turned on, and inductor 162 is coupled between node X and circuit ground. The current through inductor 162 falls during the Off state, with the rate of the fall being dependent on the $V_{LOAD}$ voltage at node X and the inductance of inductor 162. The $V_{DD1}$ voltage thus provides current to load 164 via inductor 162 during the On state, and inductor 162 provides its stored energy to load 164 during the Off state.

Envelope amplifier 170 operates as follows. When the envelope signal increases, the output of op-amp 310 increases, the D1 output of driver 312 decreases and the D2 output of driver 312 decreases until NMOS transistor 316 is almost turned off, and the output of envelope amplifier 170 increases. The converse is true when the envelope signal decreases. The negative feedback from the output of envelope amplifier 170 to the inverting input of op-amp 310 results in envelope amplifier 170 having unity gain. Hence, the output of envelope amplifier 170 follows the envelope signal, and the $V_{LOAD}$ voltage is approximately equal to the envelope signal. Driver 312 may be implemented with a class AB amplifier in order to improve efficiency, so that a large output current can be supplied even though the bias current in MOS transistors 314 and 316 is very low.

FIG. 3 shows an exemplary design of switcher 160 and envelope amplifier 170. Switcher 160 and envelope amplifier 170 may also be implemented in other manners. For example, envelope amplifier 170 may be implemented as described in U.S. Pat. No. 6,300,826, entitled "Apparatus and Method for Efficiently Amplifying Wideband Envelope Signals," issued Oct. 9, 2001.

Power supply generator 150 can efficiently generate the $V_{LOAD}$ voltage with a combination of switcher 160 and envelope amplifier 170. Switcher 160 has high efficiency and delivers a majority of the supply current for power amplifier 130. Envelope amplifier 170 operates as a linear stage and has relatively high bandwidth (e.g., in the MHz range). Switcher 160 operates to reduce the output current from envelope amplifier 170, which improves overall efficiency.

Switcher 160 can efficiently generate DC and low frequency components of the $V_{LOAD}$ voltage for power amplifier 130. This is achieved by continually switching node Y between the $V_{DD1}$ voltage and circuit ground via MOS transistors 334 and 336. This continual switching results in the $V_{SW}$ signal at node Y including a large amount of switcher noise. The switcher noise may be filtered by inductor 162 but may still be present at node X. Envelope amplifier 170 can more fully attenuate the switcher noise at node X (to a low level or possibly zero) if it has sufficient loop gain. However, the loop gain of envelope amplifier 170 is limited, and the switcher noise may not be properly attenuated. In this case, the switcher noise would be passed to power amplifier 130 and would then modulate power amplifier 130 and generate spurious emissions. The spurious emissions may fall within a receive band or an alternate channel. The resultant receive band noise may (i) degrade the performance of a receiver that is co-located with the transmitter in a full-duplex radio and/or (ii) violate out-of-band emission mask requirements.

In an aspect, switcher noise may be attenuated by applying the $V_{SW}$ signal (which contains the switcher noise) to envelope amplifier 170 via a feedback circuit. The feedback circuit may have a transfer function defined such that the switcher noise can be attenuated at node X even when the envelope amplifier is non-ideal.

Figure 4:
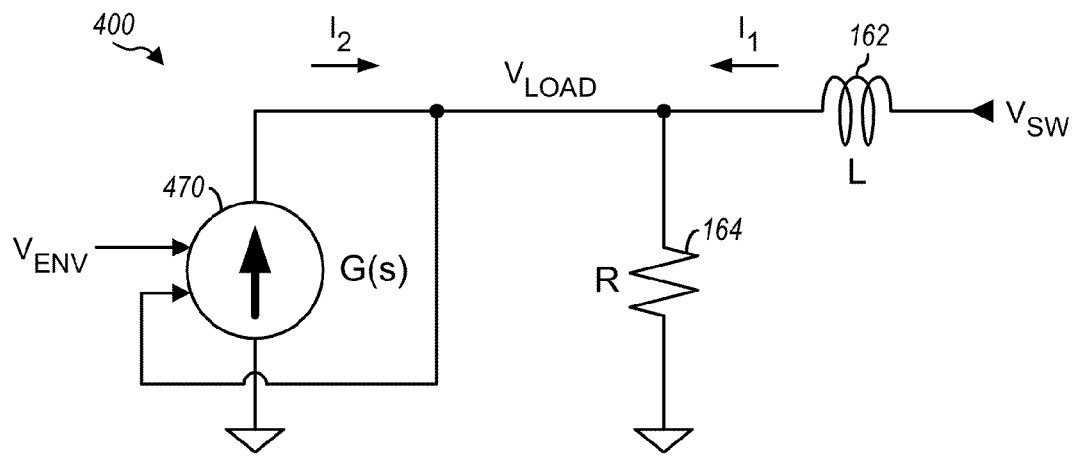
FIG. 4 shows an equivalent circuit for the power supply generator in FIG. 3.

FIG. 4 shows an equivalent circuit 400 for power supply generator 150 in FIG. 3. In equivalent circuit 400, inductor 162 has an inductance of L, and load 164 has a resistance of R. Furthermore, envelope amplifier 170 is modeled with a current source 470 having a frequency-dependent transconductance of G(s), which may be expressed as:

$$G(s) = \frac{g_m}{1 + \frac{s}{\omega_0}}, \qquad \text{Eq (1)}$$

where $g_m$ is a small-signal transconductance of current source 470, $\omega_0$ is the bandwidth of current source 470, and $s = j\omega$.

As shown in equation (1), the transconductance G(s) may be modeled with a lowpass filter having a bandwidth of $\omega_0$ and a DC gain of $g_m$. Current source 470 provides the $I_2$ current, which may be expressed as:

$$I_2 = (V_{ENV} - V_{LOAD}) * G(s) \qquad \text{Eq (2)}$$

Figure 5A:
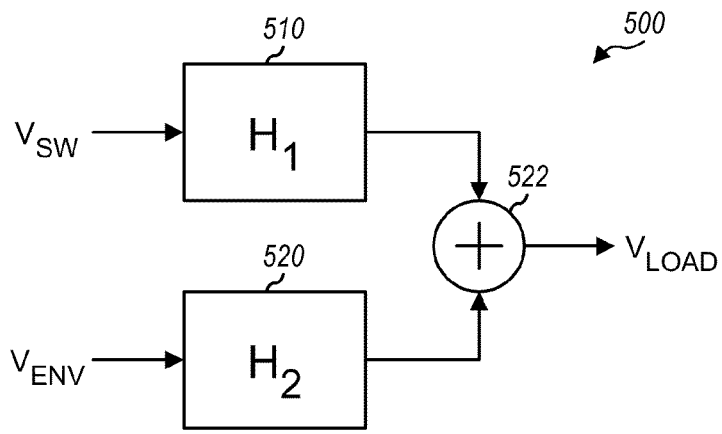
FIGS. 5A and 5B show linear models of a power supply generator without noise cancellation and a power supply generator with noise cancellation, respectively.

FIG. 5A shows a linear model 500 of a power supply generator without noise cancellation. The $V_{SW}$ signal is provided to a block 510 having a first transfer function of $H_1$ for the coupling circuit between switcher 160 and load 164. The $V_{ENV}$ signal is provided to a block 520 having a second transfer function of $H_2$ for envelope amplifier 170. A summer 522 receives and sums the outputs of blocks 510 and 520 and provides the $V_{LOAD}$ voltage. The $V_{SW}$ signal includes switcher noise, which is processed by the $H_1$ transfer function and passed to the $V_{LOAD}$ voltage.

Figure 5B:
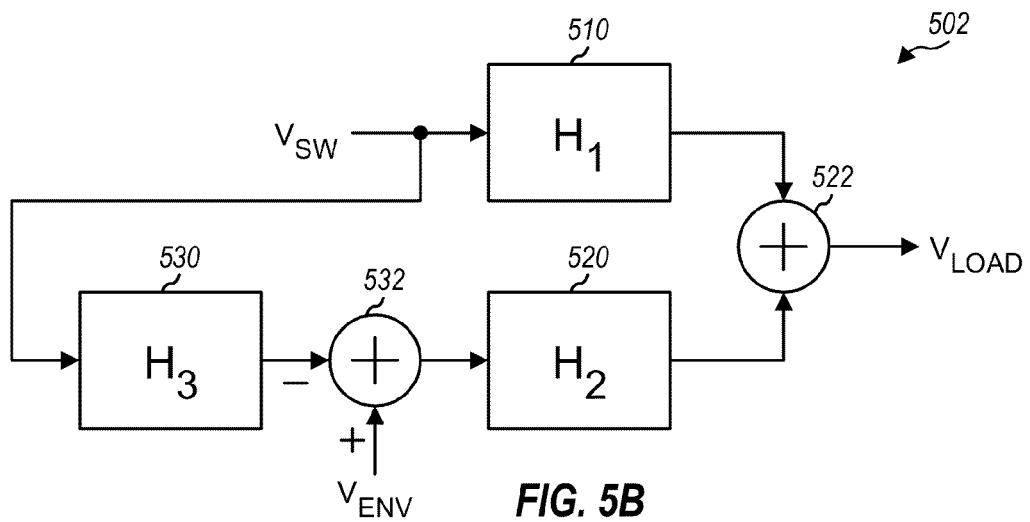

FIG. 5B shows a linear model 502 of a power supply generator with noise cancellation. The $V_{SW}$ signal is provided to block 510 having the first transfer function of $H_1$ and is also provided to a block 530 having a third transfer function of $H_3$. A summer 532 receives and subtracts the output of block 530 from the $V_{ENV}$ signal. The output of summer 532 is provided to block 520 having the second transfer function of $H_2$. Summer 522 receives and sums the outputs of blocks 510 and 520 and provides the $V_{LOAD}$ voltage. The $V_{SW}$ signal includes switcher noise, which is processed by the $H_1$ transfer function and provided to summer 522. The $V_{SW}$ signal is also processed by the $H_3$ and $H_2$ transfer functions and provided to summer 522.

The $H_3$ transfer function may be selected such that the switcher noise provided by block 520 approximately matches (and thus attenuates) the switcher noise provided by block 510. In particular, the $H_3$ transfer function may be defined so that $V_{LOAD}/V_{SW}=0$.

The $H_1$ and $H_2$ transfer functions for equivalent circuit 500 in FIG. 5A as well as the $H_3$ transfer function that can attenuate the switcher noise may be expressed as:

$$H_1 = \frac{R \cdot (\omega_0 + s)}{(s \cdot L + R + R \cdot g_m \cdot s \cdot L) \cdot \omega_0 + s \cdot R + s^2 \cdot L}, \quad \text{Eq (3)}$$

$$H_2 = \frac{R \cdot s \cdot L \cdot g_m \cdot \omega_0}{(s \cdot L + R + R \cdot g_m \cdot s \cdot L) \cdot \omega_0 + s \cdot R + s^2 \cdot L}, \quad \text{Eq (4)}$$

and $$H_3 = \frac{\omega_0 + s}{\omega_0 \cdot g_m \cdot s \cdot L}. \quad \text{Eq (5)}$$

The $H_3$ transfer function in equation (5) is applicable for the $H_1$ transfer function in equation (3) and the $H_2$ transfer function in equation (4). The $H_1$ and $H_2$ transfer functions in equations (3) are (4) are applicable for the equivalent circuit shown in FIG. 4. In general, the $H_1$ transfer function may be dependent on the design of envelope amplifier 170, and the $H_2$ transfer function may be dependent on the coupling circuit connected between the output of switcher 160 and node X. The $H_3$ transfer function may be dependent on the $H_1$ and $H_2$ transfer functions. The $H_1$, $H_2$ and $H_3$ transfer functions may be determined based on computer simulation, mathematical derivation, empirical measurements, etc. In one design, the $H_1$, $H_2$ and $H_3$ transfer functions may be determined based on Matlab, which is a computer simulation tool that is commercially available.

The $H_3$ transfer function may be rewritten as follows:

$$\begin{aligned} H_3 &= \frac{\omega_0 + s}{\omega_0 \cdot g_m \cdot s \cdot L} \\ &= \underbrace{\frac{1}{s} \cdot \frac{1}{g_m \cdot L}}_{\text{integrating term}} + \underbrace{\frac{1}{\omega_0 \cdot g_m \cdot L}}_{\text{constant term}} \\ &= \underbrace{\frac{1}{s} \cdot \frac{1}{g_m \cdot L}}_{\text{integrating term}} + \underbrace{\frac{R}{\omega_u \cdot L}}_{\text{constant term}}, \end{aligned} \quad \text{Eq (6)}$$

where $\omega_u$ is a unity gain bandwidth of envelope amplifier 170 in FIG. 3 and may be given as $\omega_u = \omega_0 \cdot g_m \cdot R$.

As shown in equation (6), the $H_3$ transfer function may be decomposed into an integrating term and a constant term. The integrating term (or the first term) has a single pole at DC and a frequency response that rolls off at a rate of 20 decibels (dB) per decade. The constant term (or the second term) has a response that is constant across frequency. The $H_3$ transfer function thus has (i) a high gain at low frequency due to the integrating term and (ii) a fixed gain at high frequency due to the constant term.

Envelope amplifier 170 has a limited DC gain and a limited bandwidth, both of which are dependent on the design of envelope amplifier 170. The limited DC gain and limited bandwidth result in the switcher noise being passed to the $V_{LOAD}$ voltage.

FIG. 6 shows waveforms of various signals in power supply generator 150 in FIG. 3. The $V_{SW}$ signal has a waveform 612 and includes the switcher noise, which is represented by a square wave in waveform 612. For simplicity, the $V_{ENV}$ signal is assumed to include only a DC voltage. The $V_{LOAD}$ voltage has a waveform 614 and includes supply noise due to the switcher noise. The supply noise includes two components—a triangle component and a square component. The triangle component of the supply noise is due to the limited DC gain of envelope amplifier 170 and has a waveform 616. The square component of the supply noise is due to the limited bandwidth of envelope amplifier 170 and has a waveform 618. Waveform 614 is obtained by superimposing waveforms 616 and 618.

It can be shown that the integrating term in equation (6) can account for the effects of the limited DC gain of envelope amplifier 170. It can also be shown that the constant term in equation (6) can account for the effects of the limited bandwidth of envelope amplifier 170.

Computer simulation was performed to study the effects of limited DC gain and limited bandwidth of envelope amplifier 170 on noise in a receive band for power supply generator 150 in FIG. 3 without noise cancellation. In particular, noise in the receive band due to switcher noise modulating power amplifier 130 was measured for different DC gains and different bandwidths of envelope amplifier 170. The simulations show that the limited DC gain of envelope amplifier 170 has less effect on noise in the receive band, and that a DC gain of about few tens of dB may be sufficient for envelope amplifier 170. The simulations also show that the limited unity gain bandwidth (UGBW) of envelope amplifier 170 has more effects on noise in the receive band. The simulations indicate that a very high unity gain bandwidth is needed for envelope amplifier 170 in order to reduce the noise in the receive band below a target level. However, it may be difficult to obtain a sufficient unity gain bandwidth for envelope amplifier 170, especially if envelope amplifier 170 is fabricated using standard complementary metal oxide semiconductor (CMOS) process.

Noise cancellation/attenuation may be performed in various manners. In one design, both limited DC gain and limited bandwidth of envelope amplifier 170 may be addressed by implementing a feedback circuit with both the integrating term and the constant term in equation (6). This design may address both (i) the triangle component of the supply noise corresponding to waveform 616 in FIG. 6 and (ii) the square component of the supply noise corresponding to waveform 618 in FIG. 6. This design may provide better performance (e.g., less noise in the receive band). In another design, only the limited bandwidth of envelope amplifier 170 may be addressed by implementing a feedback circuit with only the constant term in equation (6). The effects due to the limited DC gain of envelope amplifier 170 may be ignored. This design may address the square component of the supply noise corresponding to waveform 618 in FIG. 6. This design may simplify implementation of noise cancellation.

Figure 7:
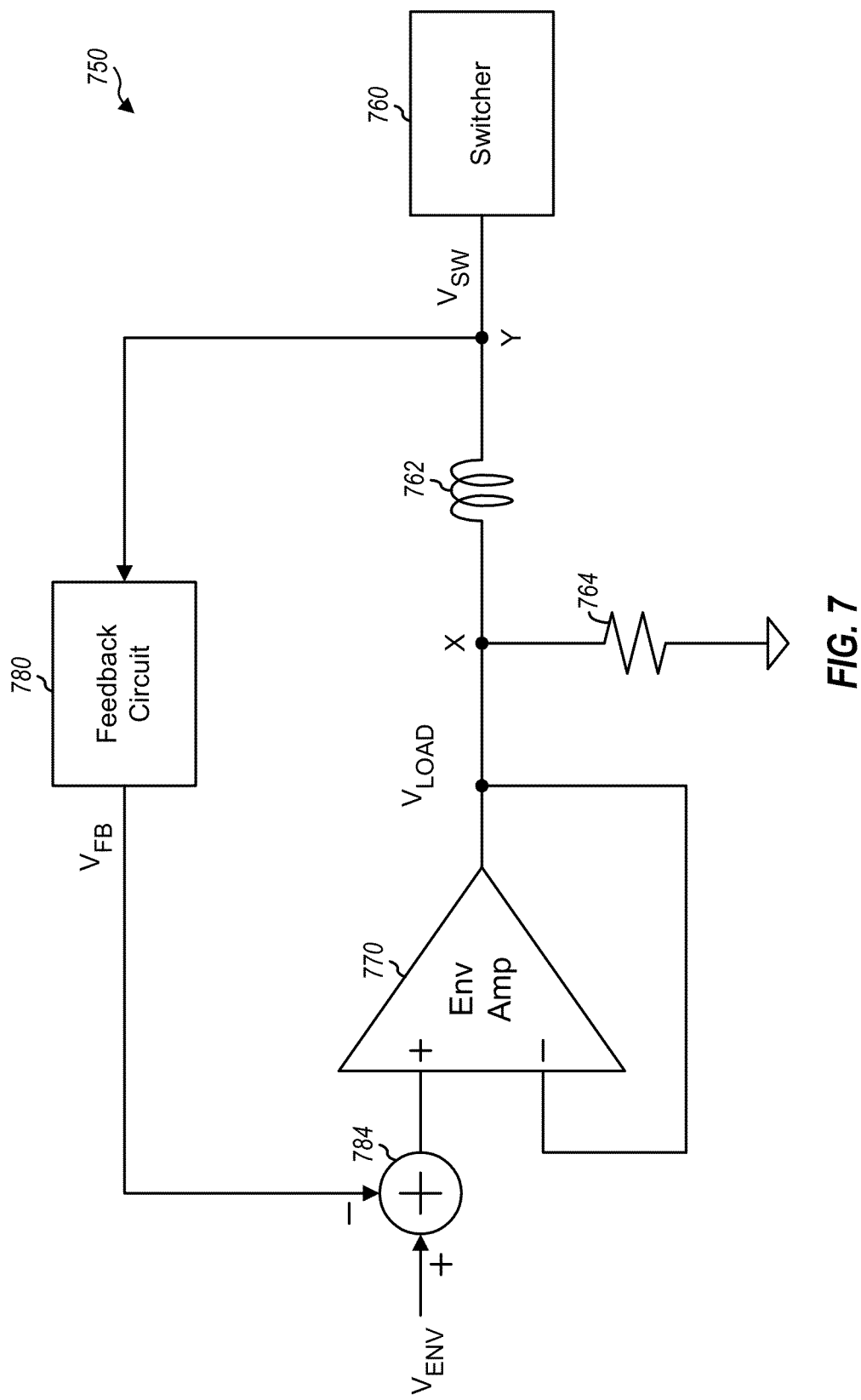
FIG. 7 shows a schematic diagram of a power supply generator with noise cancellation.

FIG. 7 shows a schematic diagram of a power supply generator 750 with noise cancellation. Power supply generator 750 includes a switcher 760, an envelope amplifier 770, and an inductor 762, which correspond to and are coupled in similar manner as switcher 160, envelope amplifier 170, and inductor 162 in power supply generator 150 in FIG. 3. Power supply generator 750 further includes a feedback circuit 780 and a summer 784. Feedback circuit 780 receives the $V_{SW}$ signal from switcher 760 and provides a feedback signal ($V_{FB}$) to summer 784. Summer 784 receives and subtracts the $V_{FB}$ signal from the $V_{ENV}$ signal and provides its output to the non-inverting input of envelope amplifier 770. Summer 784 may be implemented with a circuit that can sum two voltage or current signals, or a summing node that can sum two current signals, etc. Envelope amplifier 770 is connected as a unity gain amplifier and has its output coupled to its inverting input. Envelope amplifier 770 provides the $V_{LOAD}$ voltage to a load 764, which may represent power amplifier 130 in FIG. 1.

In one design, feedback circuit 780 implements only the constant term in equation (6). In this design, feedback circuit 780 can address the limited bandwidth of envelope amplifier 770 and can attenuate the square component of the PA supply noise, which is shown by waveform 618 in FIG. 6. In another design, feedback circuit 780 implements both the integrating term and the constant term in equation (6). In this design, feedback circuit 780 can address both the limited DC gain and the limited bandwidth of envelope amplifier 770 and can attenuate both the triangle component and the square component of the PA supply noise, which are shown by waveforms 616 and 618 in FIG. 6.

Figure 8A:
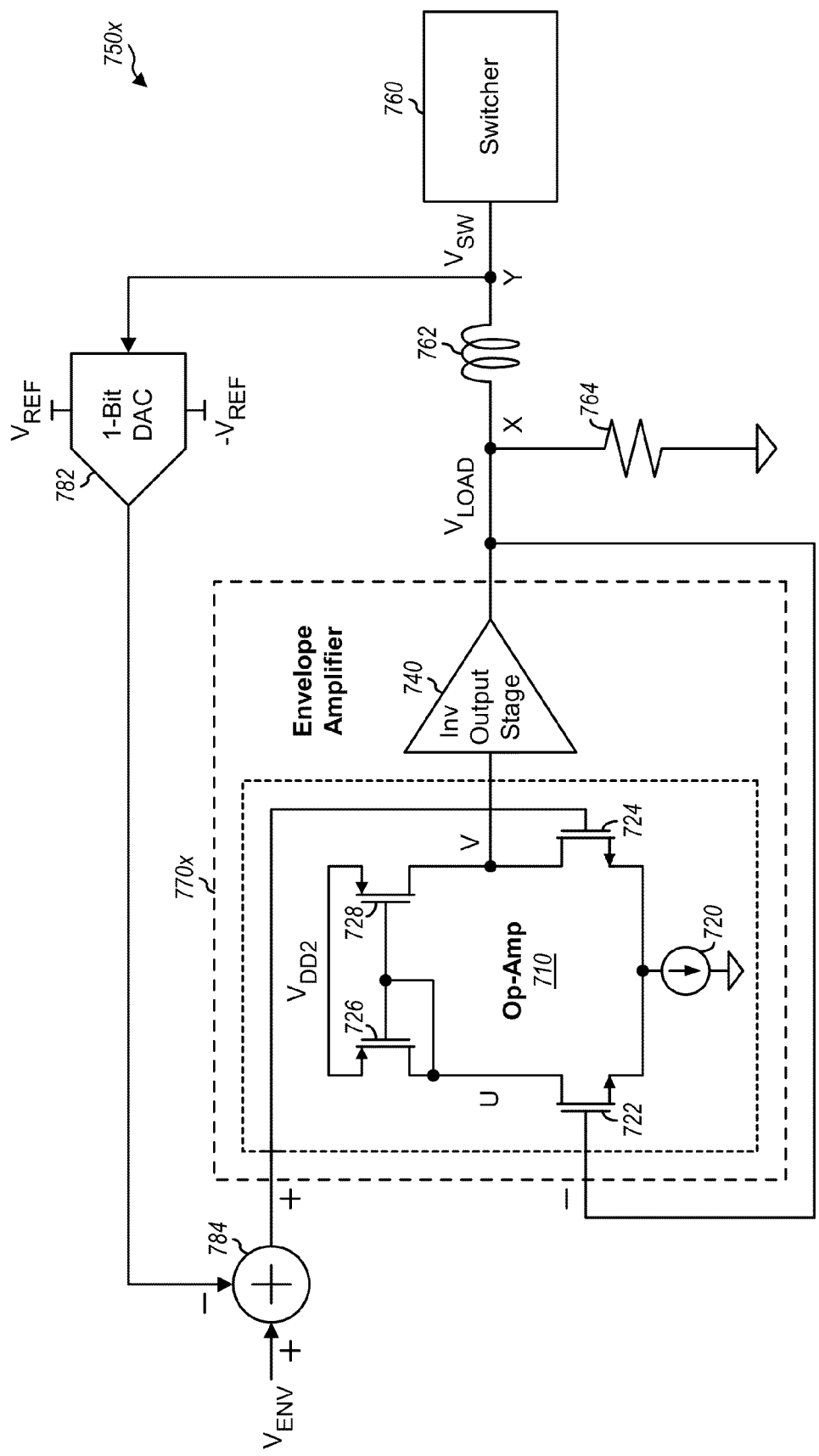
FIGS. 8A, 8B and 8C show three designs of the power supply generator with noise cancellation in FIG. 7.

FIG. 8A shows a schematic diagram of a power supply generator 750x with noise cancellation, which is one design of power supply generator 750 in FIG. 7. Power supply generator 750x includes an envelope amplifier 770x and a 1-bit digital-to-analog converter (DAC) 782, which are one design of envelope amplifier 770 and feedback circuit 780, respectively, in FIG. 7. DAC 782 receives the $V_{SW}$ signal from switcher 760 and provides the feedback signal. The feedback signal is equal to (i) a positive reference voltage ($V_{REF}$) when the $V_{SW}$ signal is at a high level or (ii) a negative reference voltage ($-V_{REF}$) when the $V_{SW}$ signal is at a low level. The $V_{REF}$ voltage may be defined as follows:

$$V_{REF} = \frac{R}{\omega_u \cdot L}. \qquad \text{Eq (7)}$$

In the design shown in FIG. 8A, the feedback signal has a waveform that is similar to the waveform of the $V_{SW}$ signal. The desired amplitude of the square wave in the feedback signal can be obtained with the proper $V_{REF}$ voltage, which may be defined as shown in equation (7).

In the design shown in FIG. 8A, envelope amplifier 770x includes an op-amp 710 and an inverting (Inv) output stage 740. Within op-amp 710, NMOS transistors 722 and 724 have their sources coupled together and their gates coupled to an inverting input and a non-inverting input of op-amp 710. A current source 720 is coupled between the sources of NMOS transistors 722 and 724 and circuit ground. PMOS transistors 726 and 728 have their sources coupled to the $V_{DD2}$ voltage and their gates coupled together. PMOS transistor 726 has its drain coupled to its gate and further to the drain of NMOS transistor 722 at node U. PMOS transistor 728 has its drain coupled to the drain of NMOS transistor 724 at node V. NMOS transistors 722 and 724 are coupled as a differential pair. PMOS transistors 726 and 728 form an active load for NMOS transistors 722 and 724. Output stage 740 has its input coupled to node V and its output providing the $V_{LOAD}$ voltage. Output stage 740 may be implemented with class AB driver 312 and MOS transistors 314 to 320 in FIG. 3.

Figure 8B:
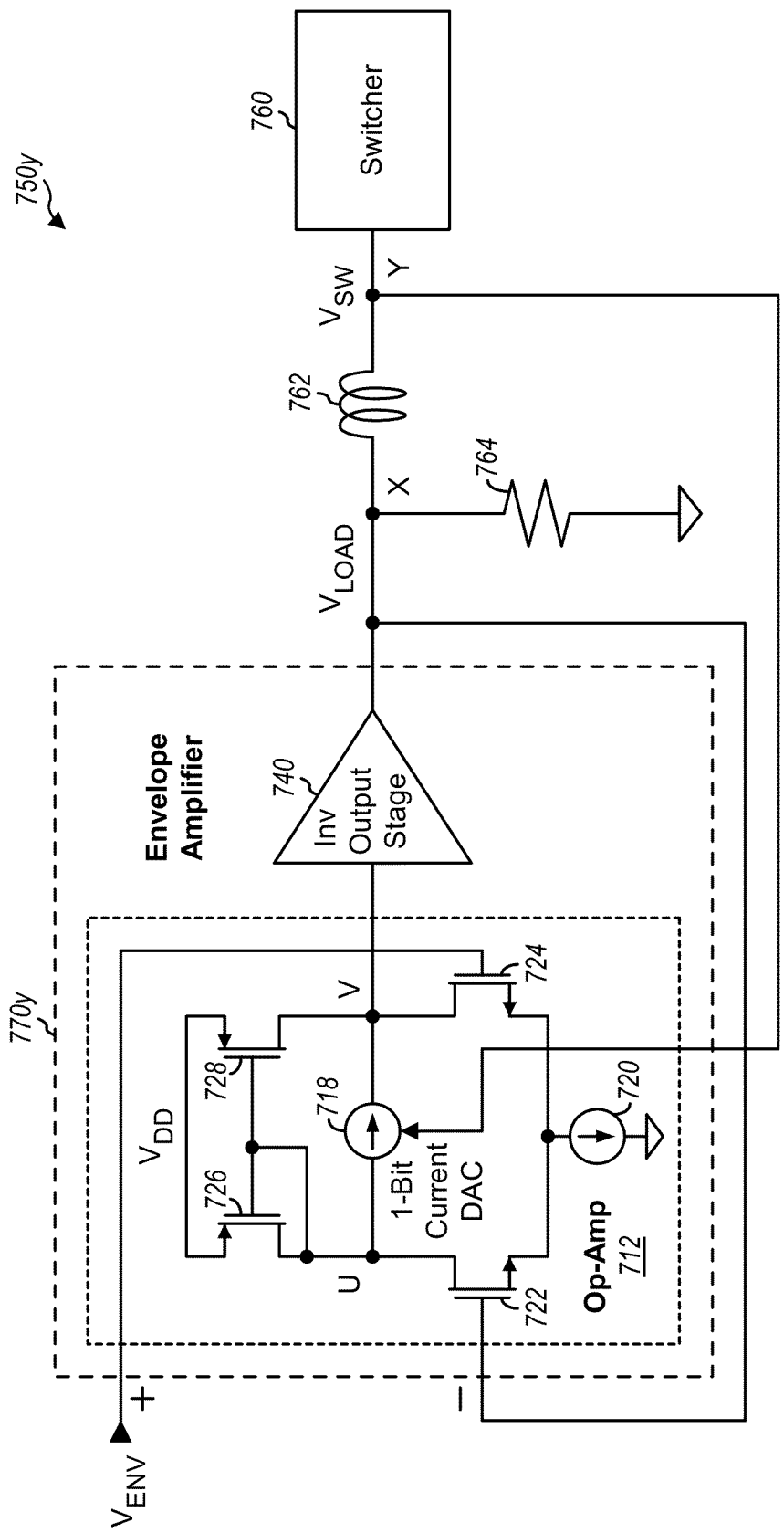

FIG. 8B shows a schematic diagram of a power supply generator 750y with noise cancellation, which is another design of power supply generator 750 in FIG. 7. Power supply generator 750y includes an envelope amplifier 770y that efficiently implements both envelope amplifier 770x and 1-bit DAC 782 in FIG. 8A.

Envelope amplifier 770y includes an op-amp 712 with a built-in 1-bit DAC. Op-amp 712 includes current source 720 and MOS transistors 722 to 728, which are coupled as described above for FIG. 8A. Op-amp 712 further includes a current source 718 having a first end coupled to node U and a second end coupled to node V. Current source 718 operates as a 1-bit current steering DAC and receives the $V_{SW}$ signal as a control signal. Current source 718 provides (i) a positive reference current ($I_{REF}$) when the $V_{SW}$ signal is at a high level or (ii) a negative reference current ($-I_{REF}$) when the $V_{SW}$ signal is at a low level. The $I_{REF}$ current may be defined as follows:

$$I_{REF} = \frac{g_{m1} \cdot R}{\omega_u \cdot L}, \qquad \text{Eq (8)}$$

where $g_{m1}$ is the transconductance of the differential pair composed of NMOS transistors 722 and 724.

In the design shown in FIG. 8B, the feedback signal is provided by current source 718 and is conveniently summed at node U and node V. The desired amplitude of the square wave in the feedback signal can be obtained with the proper $I_{REF}$ current, which may be defined as shown in equation (8).

Figure 8C:
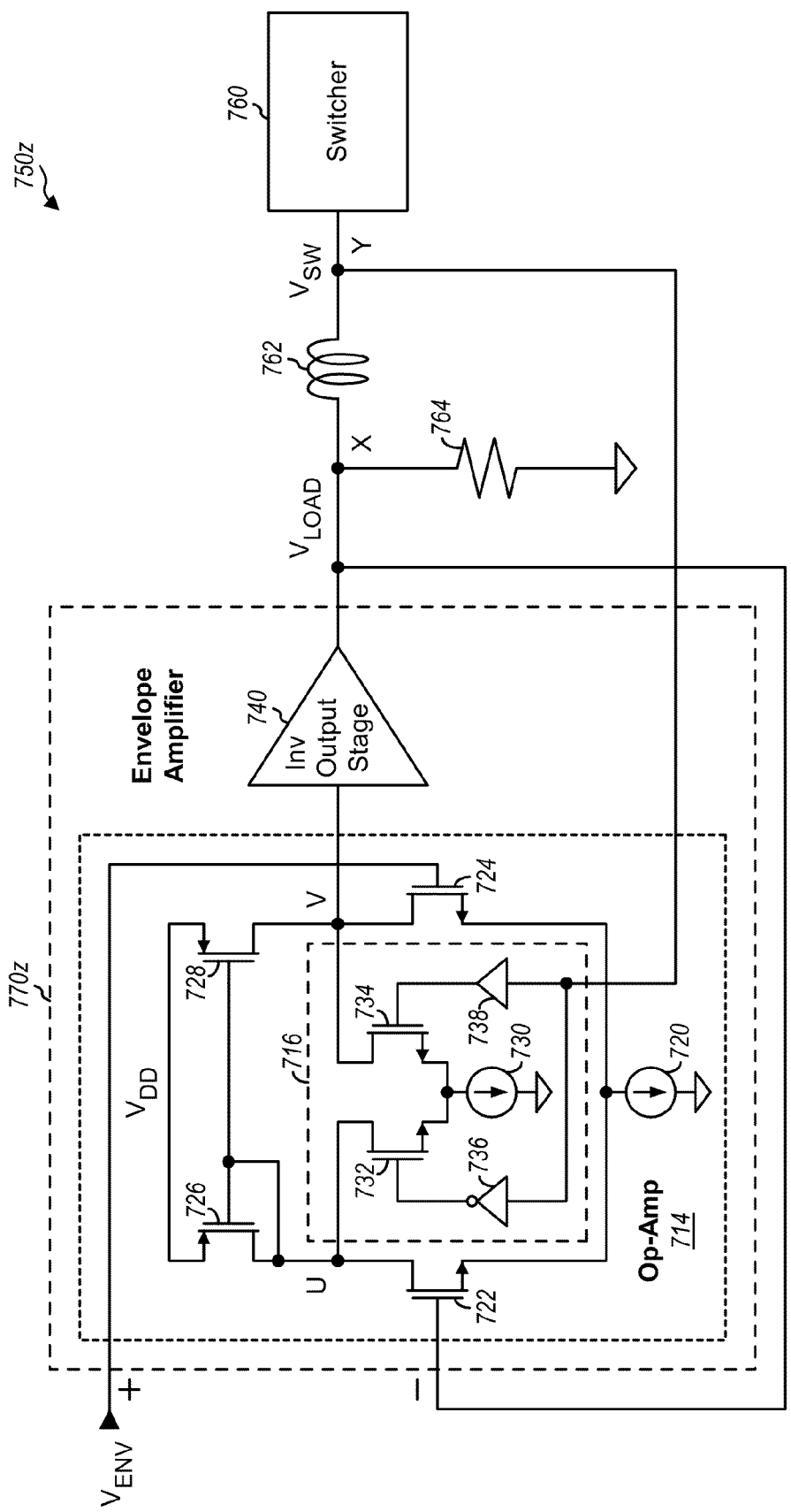

FIG. 8C shows a schematic diagram of a power supply generator 750z with noise cancellation, which is yet another design of power supply generator 750 in FIG. 7. Power supply generator 750z includes an envelope amplifier 770z, which is one design of envelope amplifier 770y in FIG. 8B.

Envelope amplifier 770z includes an op-amp 714 with a built-in 1-bit DAC 716. Op-amp 714 includes current source 720 and MOS transistors 722 to 728, which are coupled as described above for FIG. 8A. Op-amp 714 further includes 1-bit current steering DAC 716 that is implemented with a current source 730, NMOS transistors 732 and 734, an inverter 736, and a buffer 738. NMOS transistors 732 and 734 have their sources coupled together and their drains coupled to node U and node V, respectively. Current source 730 is coupled between the sources of NMOS transistors 732 and 734 and circuit ground. Inverter 736 has its input receiving the $V_{SW}$ signal and its output coupled to the gate of NMOS transistor 732. Buffer 738 has its input receiving the $V_{SW}$ signal and its output coupled to the gate of NMOS transistor 734.

DAC 716 operates as follows. When the $V_{SW}$ signal is at a high level, NMOS transistor 734 is turned on via buffer 738, and NMOS transistor 732 is turned off via inverter 736. Current source 730 then sinks a current of $I_{REF}$ from node V. Conversely, when the $V_{SW}$ signal is at a low level, NMOS transistor 732 is turned on via inverter 736, and NMOS transistor 734 is turned off via buffer 738. Current source 730 then sinks a current of $I_{REF}$ from node U. The $I_{REF}$ current may be defined as shown in equation (8).

FIGS. 8A, 8B and 8C show three exemplary designs of implementing a feedback circuit having a transfer function comprising only the constant term in equation (6). A feedback circuit for a constant term may also be implemented in other manners. A feedback circuit may also have a transfer function comprising other terms instead of, or in addition to, the constant term.

The noise cancellation techniques described herein may provide various advantages. First, the techniques may reduce the amount of noise in a receive band, which may improve performance. The techniques can solve a difficult problem of receive band noise in a full-duplex radio using envelope tracking Second, the techniques may allow for use of an envelope amplifier having a smaller bandwidth, which may reduce power consumption. Third, the techniques may allow for use of a smaller inductor at the output of a switcher, which may reduce size and/or cost. Fourth, the feedback circuit is simple and can be easily implemented in a power supply generator.

The noise cancellation techniques described herein may be used to attenuate switcher noise from a switcher in a power supply generator, as described above. The techniques may also be used to attenuate noise from other circuits or systems. In general, a signal containing noise may be provided to a feedback circuit (e.g., block 530 in FIG. 5B or feedback circuit 780 in FIG. 7) having a transfer function selected to attenuate the noise.

In an exemplary design, an apparatus (e.g., a wireless device, an IC, a circuit board, etc.) may include a first circuit, a second circuit, and a feedback circuit. The first circuit (e.g., block 510 in FIG. 5B) may receive a first input signal comprising noise and provide a first output signal comprising a first version of the noise. The feedback circuit (e.g., block 530 in FIG. 5B) may also receive the first input signal and provide a feedback signal. The second circuit (e.g., block 520 in FIG. 5B) may receive a second input signal and the feedback signal and provide a second output signal comprising a second version of the noise, which may be used to attenuate the first version of the noise.

In one design, the first input signal may have a waveform similar to waveform 612 in FIG. 6, and the first version of the noise may have a waveform similar to waveform 614 in FIG. 6. The second version of the noise may have a waveform that is complementary to (e.g., inverted with respect to) waveform 614 in FIG. 6. The input signals and output signals may also have other waveforms.

In one design, the first circuit may comprise an inductor (e.g., inductor 762 in FIG. 7) coupled to a switcher. The first input signal may comprise switcher noise from the switcher. In one design, the second circuit may comprise an amplifier (e.g., envelope amplifier 770 in FIG. 7), which may be coupled as a unity gain amplifier. In one design, the feedback circuit may comprise a DAC (e.g., DAC 782 in FIG. 8A). The first circuit, second circuit, and/or feedback circuit may also comprise other circuits.

In one design, a first summer (e.g., summer 532 in FIG. 5B) may subtract the feedback signal from the second input signal and provide a third input signal to the second circuit. The second circuit may receive the third input signal and provide the second output signal. In one design, a second summer (e.g., summer 522 in FIG. 5B) may sum the first and second output signals and provide a third output signal to a load. The second version of the noise may attenuate the first version of the noise at the load. The first summer may be part of the second circuit and/or may be implemented with one or more summing nodes (e.g., nodes U and V in FIG. 8C). The second summer may also be implemented with a summing node (e.g., node X in FIG. 7) and/or other circuits.

In one design, the first circuit has a first transfer function, and the second circuit has a second transfer function. The feedback circuit has a third transfer function that is determined based on the first and second transfer functions. In one design, the feedback circuit implements a transfer function comprising a constant term and/or an integrating term. For example, the feedback circuit may implement a transfer function comprising only a constant term and may have a gain that is determined based on a unity gain bandwidth of the amplifier (which corresponds to $\omega_u$ in equations (6) and (7)), an inductance of the inductor (which corresponds to L in equations (6) and (7)), an impedance of the load (which corresponds to R in equations (6) and (7)), and/or other parameters.

In another exemplary design, an apparatus (e.g., a wireless device, an IC, a circuit board, etc.) may include a switcher, a coupling circuit, an envelope amplifier, and a feedback circuit. The switcher (e.g., switcher 760 in FIG. 7) may provide a switcher output signal comprising switcher noise. The coupling circuit (e.g., inductor 762 in FIG. 7) may receive the switcher output signal and provide a first output signal to a load. The first output signal may comprise a first version of the switcher noise. The feedback circuit (e.g., feedback circuit 780 in FIG. 7) may also receive the switcher output signal and provide a feedback signal. The envelope amplifier (e.g., envelope amplifier 770 in FIG. 7) may receive an envelope signal and the feedback signal and may provide a second output signal to the load. The second output signal may comprise a second version of the switcher noise used to attenuate the first version of the switcher noise at the load. In one design, the first output signal may comprise DC and low frequency components of a supply voltage for the load, and the second output signal may comprise higher frequency components of the supply voltage for the load.

In one design, the feedback circuit may comprise a DAC (e.g., DAC 782 in FIG. 8A). In one design, the DAC may comprise a steering current source (e.g., current source 718 in FIG. 8B or current source 716 in FIG. 8C), which may reside within the envelope amplifier. In one design, the load may comprise a power amplifier configured to receive and amplify an input RF signal and provide an output RF signal. The envelope signal may be determined based on an envelope of the input RF signal.

Figure 9:
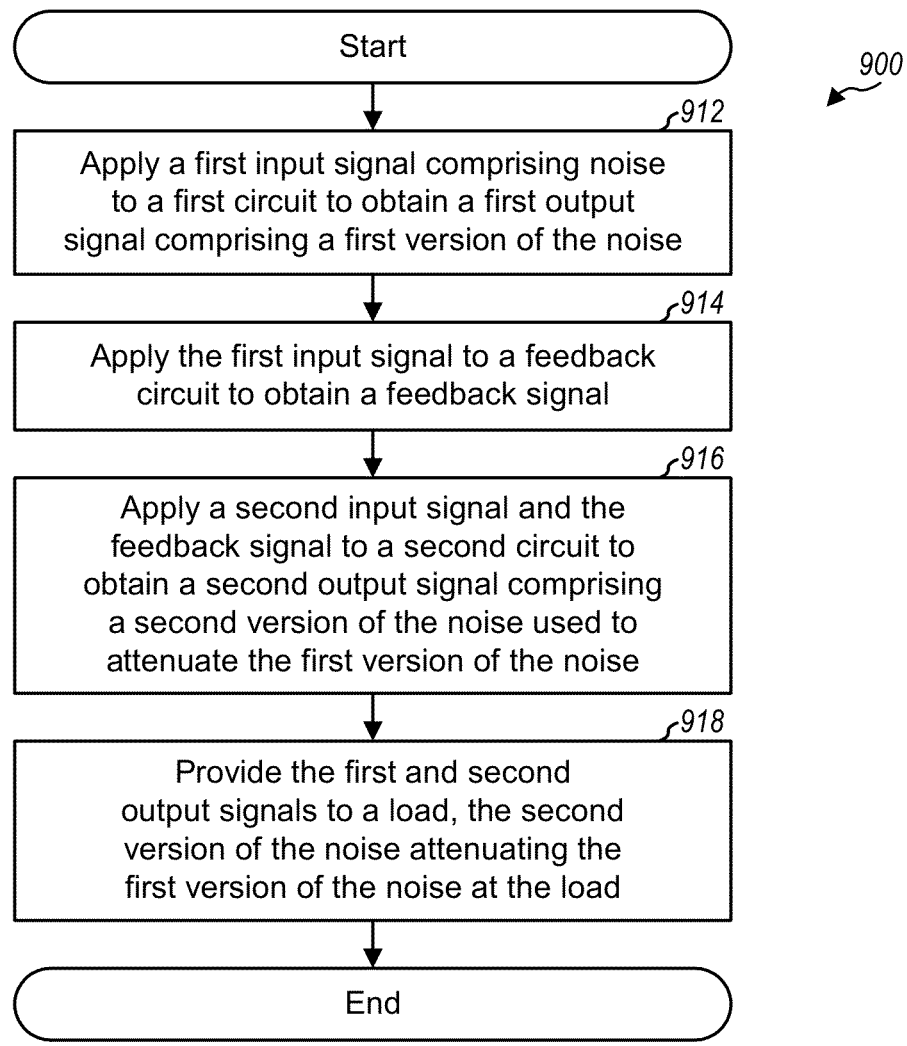
FIG. 9 shows a process for performing noise cancellation.

FIG. 9 shows a design of a process 900 for performing noise cancellation. A first input signal comprising noise may be applied to a first circuit to obtain a first output signal comprising a first version of the noise (block 912). The first input signal may also be applied to a feedback circuit to obtain a feedback signal (block 914). A second input signal and the feedback signal may be applied to a second circuit to obtain a second output signal comprising a second version of the noise, which may be used to attenuate the first version of the noise (block 916). The first and second output signals may be provided to a load, and the second version of the noise may attenuate the first version of the noise at the load (block 918).

In one design, the first input signal may be generated with a switcher and may comprise switcher noise from the switcher. In one design of block 912, the first input signal may be passed through the first circuit comprising an inductor to obtain the first output signal. In one design of block 914, the first input signal may be provided to the feedback circuit comprising a DAC to obtain the feedback signal. In one design of block 916, the second input signal and the feedback signal may be amplified with the second circuit comprising an amplifier to obtain the second output signal. The first and second input signals may also be processed in other manners.

In one design, the first circuit may have a first transfer function, and the second circuit may have a second transfer function. The feedback circuit may have a third transfer function that is determined based on the first and second transfer functions. The first version of the noise may be generated by applying the first input signal to the first circuit having the first transfer function (e.g., applying the $V_{SW}$ signal to block 510 having the $H_1$ transfer function in FIG. 5B). The first input signal may also be applied to a series combination of the feedback circuit having the third transfer function and the second circuit having the second transfer function (e.g., the $V_{SW}$ signal may be applied to the series combination of block 530 having the $H_3$ transfer function and block 520 having the $H_2$ transfer function in FIG. 5B) to generate the second version of the noise used to attenuate the first version of the noise.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
    a first circuit configured to receive a first input signal comprising noise and to provide a first output signal comprising a first version of the noise;
    a feedback circuit having an input coupled to an input of the first circuit and configured to receive the first input signal independent of the first circuit and provide a feedback signal; and
    a second circuit configured to receive a second input signal and the feedback signal and to provide a second output signal comprising a second version of the noise used to attenuate the first version of the noise.

2. The apparatus of claim 1, wherein the first circuit comprises an inductor coupled to a switcher, and wherein the first input signal comprises switcher noise from the switcher.

3. The apparatus of claim 1, wherein the second circuit comprises an amplifier.

4. The apparatus of claim 1, wherein the feedback circuit comprises a digital-to-analog converter (DAC).

5. The apparatus of claim 1, wherein the first circuit has a first transfer function and the second circuit has a second transfer function, and wherein the feedback circuit has a third transfer function determined based on the first and second transfer functions.

6. The apparatus of claim 1, wherein the feedback circuit implements a transfer function comprising a constant term, or an integrating term, or both.

7. The apparatus of claim 1, wherein the first circuit comprises an inductor and the second circuit comprises an amplifier, and wherein the feedback circuit has a gain determined based on at least one of a unity gain bandwidth of the amplifier, an inductance of the inductor, or an impedance of a load applied with the first and second output signals.

8. The apparatus of claim 1, further comprising:
    a summer configured to subtract the feedback signal from the second input signal and provide a third input signal to the second circuit.

9. The apparatus of claim 1, further comprising:
    a summer configured to sum the first and second output signals and provide a third output signal to a load, wherein the second version of the noise attenuates the first version of the noise at the load.

10. An apparatus comprising:
- a switcher configured to provide a switcher output signal comprising switcher noise;
- a coupling circuit configured to receive the switcher output signal and provide a first output signal to a load, the first output signal comprising a first version of the switcher noise;
- a feedback circuit having an input coupled to an input of the coupling circuit and configured to receive the switcher output signal independent of the coupling circuit and provide a feedback signal; and
- an envelope amplifier configured to receive an envelope signal and the feedback signal and provide a second output signal to the load, the second output signal comprising a second version of the switcher noise used to attenuate the first version of the switcher noise at the load.

11. The apparatus of claim 10, wherein the feedback circuit comprises a digital-to-analog converter (DAC).

12. The apparatus of claim 11, wherein the DAC comprises a steering current source residing within the envelope amplifier.

13. The apparatus of claim 10, wherein the first output signal comprises direct current (DC) and low frequency components of a supply voltage for the load, and wherein the second output signal comprises higher frequency components of the supply voltage for the load.

14. The apparatus of claim 10, wherein the load comprises a power amplifier configured to amplify an input radio frequency (RF) signal and provide an output RF signal, and wherein the envelope signal is determined based on an envelope of the input RF signal.

15. A method comprising:
- applying a first input signal comprising noise to a first circuit to obtain a first output signal comprising a first version of the noise;
- applying the first input signal independent of the first circuit to a feedback circuit having an input coupled to an input of the first circuit to obtain a feedback signal; and
- applying a second input signal and the feedback signal to a second circuit to obtain a second output signal comprising a second version of the noise used to attenuate the first version of the noise.

16. The method of claim 15, wherein the first and second output signals are provided to a load, and wherein the second version of the noise attenuates the first version of the noise at the load.

17. The method of claim 15, further comprising:
- generating the first input signal with a switcher, wherein the first input signal comprises switcher noise from the switcher.

18. The method of claim 15, wherein the applying the first input signal to the first circuit comprises passing the first input signal through the first circuit comprising an inductor to obtain the first output signal.

19. The method of claim 15, wherein the applying the first input signal to the feedback circuit comprises providing the first input signal to a digital-to-analog converter (DAC) to obtain the feedback signal.

20. The method of claim 15, wherein the applying the second input signal and the feedback signal to the second circuit comprises amplifying the second input signal and the feedback signal with the second circuit comprising an amplifier to obtain the second output signal.

21. The method of claim 15, wherein the first circuit has a first transfer function and the second circuit has a second transfer function, and wherein the feedback circuit has a third transfer function determined based on the first and second transfer functions.

22. The method of claim 21, wherein the first version of the noise is generated by applying the first input signal to the first circuit having the first transfer function, and wherein the second version of the noise is generated by applying the first input signal to a series combination of the feedback circuit having the third transfer function and the second circuit having the second transfer function.

23. An apparatus comprising:
- means for processing a first input signal comprising noise and providing a first output signal comprising a first version of the noise;
- means for processing the first input signal independent of the means for providing the first output signal and providing a feedback signal; and
- means for processing a second input signal and the feedback signal and providing a second output signal comprising a second version of the noise used to attenuate the first version of the noise.

24. The apparatus of claim 23, wherein the first and second output signals are provided to a load, and wherein the second version of the noise attenuates the first version of the noise at the load.

25. The apparatus of claim 23, wherein the means for processing the first input signal and providing the first output signal implements a first transfer function, wherein the means for processing the second input signal and the feedback signal implements a second transfer function, and wherein the means for processing the first input signal and providing the feedback signal implements a third transfer function determined based on the first and second transfer functions.

26. A computer program product comprising:
- a non-transitory computer-readable medium comprising:
- code for causing at least one computer to direct processing of a first input signal comprising noise to obtain a first output signal comprising a first version of the noise,
- code for causing the at least one computer to direct processing of the first input signal independent of the direct processing to obtain the first output signal to obtain a feedback signal, and
- code for causing the at least one computer to direct processing of a second input signal and the feedback signal to obtain a second output signal comprising a second version of the noise used to attenuate the first version of the noise.

* * * * *